(12) United States Patent
Stahn et al.

(10) Patent No.: US 11,326,382 B2
(45) Date of Patent: May 10, 2022

(54) DEVICE FOR TENSIONING A BOWDEN CABLE OF A CABLE-OPERATED WINDOW LIFTER

(71) Applicant: Brose Fahrzeugteile GmbH & Co. Kommanditgesellschaft, Bamberg, Bamberg (DE)

(72) Inventors: Armin Stahn, Kueps (DE); Michael Kreile, Itzgrund (DE); Udo Taubmann, Bad Rodach (DE)

(73) Assignee: Brose Fahrzeugteile GmbH & Co. Kommanditgesellschaft, Bamberg, Bamberg (DE)

( * ) Notice: Subject to any disclaimer, the term of this patent is extended or adjusted under 35 U.S.C. 154(b) by 575 days.

(21) Appl. No.: 16/326,019

(22) PCT Filed: Aug. 10, 2017

(86) PCT No.: PCT/EP2017/070270
§ 371 (c)(1),
(2) Date: Feb. 15, 2019

(87) PCT Pub. No.: WO2018/033457
PCT Pub. Date: Feb. 22, 2018

(65) Prior Publication Data
US 2021/0324669 A1 Oct. 21, 2021

(30) Foreign Application Priority Data
Aug. 17, 2016 (DE) .................... 20 2016 005 232.3

(51) Int. Cl.
*E05F 11/48* (2006.01)
*F16C 1/26* (2006.01)

(52) U.S. Cl.
CPC .............. *E05F 11/485* (2013.01); *F16C 1/26* (2013.01); *E05Y 2201/672* (2013.01); *E05Y 2900/55* (2013.01)

(58) Field of Classification Search
CPC .. F16C 1/26; E05Y 2900/55; E05Y 2201/672; E05F 11/485
(Continued)

(56) References Cited

U.S. PATENT DOCUMENTS 4,313,282 A 2/1982 Hagemann et al.
4,378,713 A * 4/1983 Haskell ................... F16C 1/226
188/196 B (Continued)

FOREIGN PATENT DOCUMENTS

CN 203129828 U 8/2013
DE 3432178 C1 1/1986
(Continued)

*Primary Examiner* — Jerry E Redman
(74) *Attorney, Agent, or Firm* — Brooks Kushman, P.C.

(57) ABSTRACT

A device for compensating cable play within a cable window-lifter, including a cable including at least one section with a Bowden, the device including a cable-guiding element configured to receive an end of the Bowden, mounted in an axially displaceable manner in a receptacle, the device including a spring arranged between a supporting surface of the receptacle and a head of the cable-guiding element, configured to keep the cable under tension and thereby compensating cable play, where stop surfaces are provided on the cable-guiding element and on the receptacle, which can engage with each other during the loading of the cable and thereby stop further compensation of the spring, and where an elastic material damping the stop noises is arranged between the stops.

19 Claims, 5 Drawing Sheets

(58) Field of Classification Search
USPC .......................................................... 49/352
See application file for complete search history.

(56) References Cited

U.S. PATENT DOCUMENTS

| | | | | |
|---|---|---|---|---|
| 4,464,950 | A * | 8/1984 | Deligny | F16C 1/226 74/501.5 R |
| 4,657,523 | A | 4/1987 | Chevance et al. | |
| 6,131,482 | A * | 10/2000 | Klippert | F16C 1/226 74/500.5 |
| 6,193,621 | B1 * | 2/2001 | McClosky | F16C 1/22 474/101 |
| 6,272,948 | B1 * | 8/2001 | Klippert | E05F 11/485 74/500.5 |
| 9,637,969 | B2 * | 5/2017 | Wild | E05F 15/689 |
| 2005/0016070 | A1 | 1/2005 | Cardine et al. | |
| 2007/0180773 | A1 * | 8/2007 | Fortin | E05F 15/689 49/352 |
| 2009/0090065 | A1 * | 4/2009 | Kinoshita | B60J 1/17 49/352 |
| 2010/0043295 | A1 * | 2/2010 | Barr | E05F 11/485 49/352 |
| 2016/0047411 | A1 * | 2/2016 | Simonneau | E05F 15/695 49/352 |
| 2018/0328400 | A1 * | 11/2018 | Huang | E05F 11/483 |

FOREIGN PATENT DOCUMENTS

| | | | |
|---|---|---|---|
| DE | 3737733 C1 | 5/1988 | |
| DE | 19852977 C1 | 10/1999 | |
| DE | 202007007032 U1 | 4/2008 | |
| DE | 202008011934 U1 | 2/2010 | |
| EP | 0853201 A1 * | 7/1998 | .............. F16C 1/226 |
| EP | 1239107 A1 | 11/2002 | |
| EP | 1498565 A2 * | 1/2005 | ............ E05F 11/485 |
| JP | 2005083171 A | 3/2005 | |
| WO | WO-2012083427 A1 * | 6/2012 | ............ E05F 11/485 |

* cited by examiner

DEVICE FOR TENSIONING A BOWDEN CABLE OF A CABLE-OPERATED WINDOW LIFTER

CROSS-REFERENCE TO RELATED APPLICATIONS

This application is the U.S. National Phase of PCT Application No. PCT/EP2017/070270 filed on Aug. 10, 2017, which claims priority to DE 20 2016 005 232.3 filed on Aug. 17, 2016, the entire disclosures of which are hereby incorporated in their entirety by reference herein.

TECHNICAL FIELD

The present disclosure relates to a device for compensating cable play within a cable (winch)-operated window lifter.

BACKGROUND

Window lifters may include a cable that may be provided with has a Bowden tube and a device, such as a cable-guiding element that may be configured to compensate for free play within the cable.

SUMMARY

According to one embodiment, a device for compensation for cable play within a cable window lifter provided with a cable including at least one section with a Bowden is provided. The device may include a cable-guiding element, configured to receive an end of the Bowden, mounted in an axially displaceable manner in a receptacle, a spring arranged between a support surface of the receptacle and a head of the cable-guiding element configured to keep the cable under tension two pairs of stops that may be formed between the cable-guiding element and its receiving element. The two pairs of stops may operate such that if the cable force exceeds the tensioning force of the spring, the first pair of stops may engage each other and an intermediate elastic damper, so that the damper is only partially compressed.

The window lifter may include a second pair of stops that may engage each other, after the first pair of stops engage each other, to avoid overloading the elastic material.

The stops of the second pair of stops may thus be completely undamped, that is to say designed as hard stops, so that with their engagement, any further compression of the damper is suppressed between the stops of the first pair of stops. Excessive noise may be prevented by the damping element, in that a large part of the kinetic energy of the cable-guiding element is released during its compression, before the stops of the second/d pair of stops engage with each other, and thus prevent overstressing of the damping element.

According to another embodiment, it is also possible to equip the second pair of stops with a damping element, but in which this is much harder and thus less compressible to design. Of course, in the dimensioning of the damping element of the first pair of stops in this variant, the manner of compressing the harder damping element is taken into account. This variant is technically a bit more expensive, but it is also effective in terms of the damping effect.

According to another embodiment, the stops of the first pair of stops may be formed on the one hand by the outer edge of the spring housing, and on the other hand formed by the surface of the head of the cable-guiding element facing the spring housing. The damping element arranged between the stops of the first pair of stops may be designed in a simple manner as a separate element made of an elastomer or rubber. However, it may also be designed using the 2-component injection molding on the head of the cable-guiding element, or on the free edge of the spring housing of the receiving element.

According to yet another embodiment, a damping element may be arranged between the stops of the first pair of stops, that may be formed as an integral component of the spring housing. In this case, the spring housing features a window-like recess in such a way that a springy section extends between lateral supports. This springy section may act as a damping element, when the protrusion integrally designed on the head of the cable-guiding element acts on the springy section. The spring effect largely ends when the areas adjacent to the protrusion of the head resting on the associated stop surfaces of the less elastic lateral supports.

The stops of the second pair of stops, which should prevent overuse of the elastic damping element, are designed by a protruding inner stop in the inner channel of the receiving element on the one hand, and on the other hand by the free end of the inner guide shaft of the cable-guiding element. As already mentioned above, the inner stop or the free end of the inner guide shaft may be equipped with a damping element, which has a much lower elasticity and a much higher continuous load capacity than the other damping element.

It should be noted at this point that the receiving element for the cable guide element does not necessarily—as is common practice—have to be a component of a cable outlet housing a window lifter drive. The receiving element may also be part of another mounting element, for example, a mounting plate of a door module.

In one or more embodiments, the more elastic stop may be arranged in the region of the second pair of stops, and the less elastic or harder stop may be arranged in the region of the first pair of stops.

Various embodiments will be explained in more detail below.

BRIEF DESCRIPTION OF THE DRAWINGS

FIG. 5b is a sectional view through the device according to FIG. 5a.

DETAILED DESCRIPTION

DE 20 2007 007 032 U1 and DE 198 52 977 C1 disclose generic devices for Bowden window lifters with a cable-guiding element accommodating a Bowden tube end, which is moveably embedded in a base-side receiving element and is initially tensioned elastically by at least one compression spring against the Bowden tube end. Provided that the cable force exceeds the maximum tensioning force of the compression spring, for example, when approaching the closed position of the window, the cable-guiding element is moved axially in the receiving element, until it encounters an associated stop or the spring reaches the blocked state.

When reaching the block state and/or a stop, there regularly appear sounds, which should be avoided or at least dampened.

In DE 20 2008 011 934 U1 a cable-guiding element is described, which includes a combination of two materials, wherein one of the two materials may include a comparatively more elastic material and is suitable to make a noise-damping stop.

However, it has proved disadvantageous, in that the stability of the elastic component cannot be ensured over a sufficiently long period of time. When the elastic material in the blocked state of the window lifter, i.e. in the closed position of the window pane, remains compressed for a long period of time and is exposed to elevated temperatures at the same time, it arrives at a so-called setting of the material. As a result, the material thickness decreases and the material hardens.

The effectiveness of the damper therefore decreases noticeably.

One or more embodiments of the present disclosure may provide a permanently good damping effect of the elastic material that may be maintained even when the system—in which the device for compensating the cable is integrated—for a comparatively long period of time, and under unfavorable thermal conditions.

Figure 1:
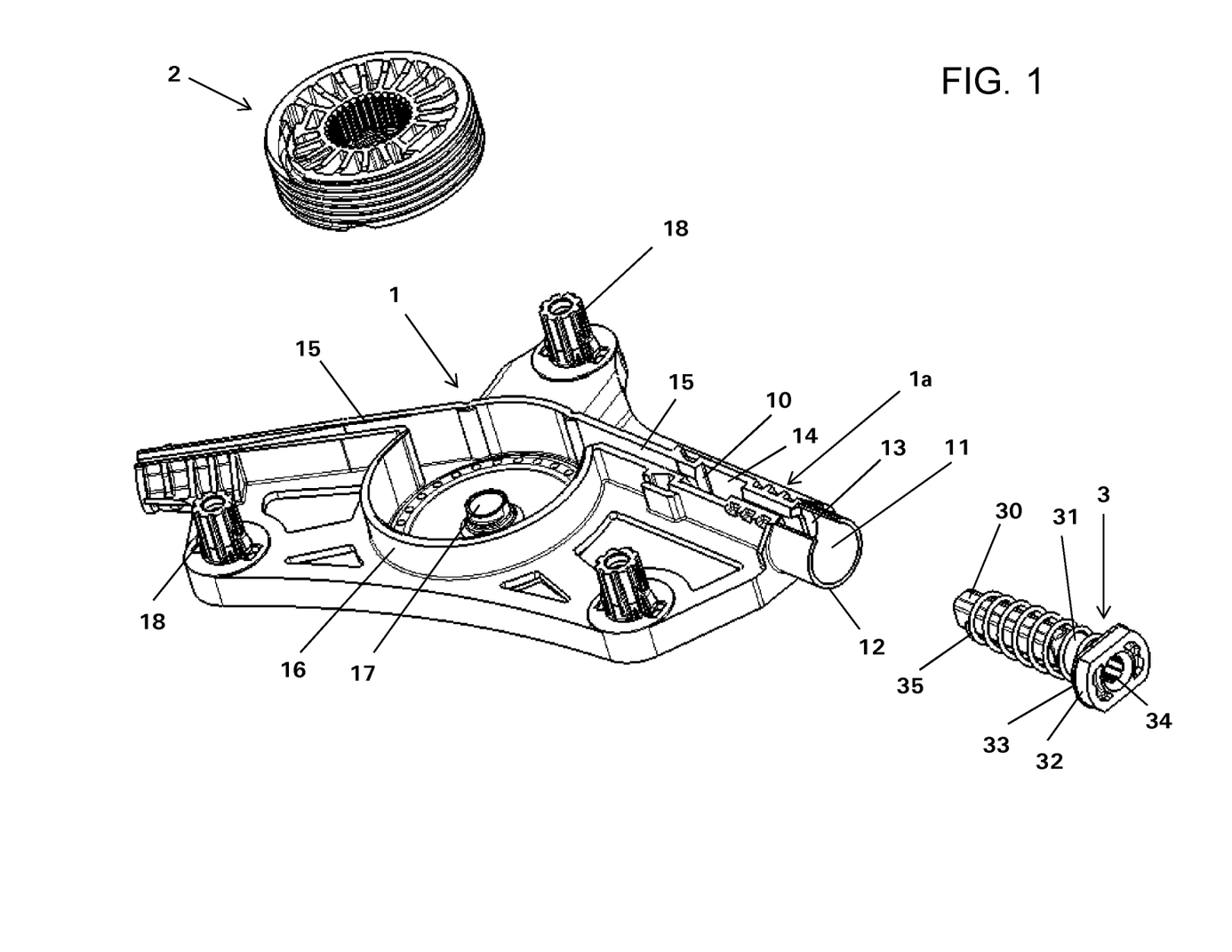
FIG. 1 is an exploded view of a cable outlet housing with a springy displaceable cable-guiding element and cable drum.

FIG. 1 shows the basic structure of a typical cable outlet housing 1, which is a component of a window lifter drive not shown in detail here, in which the housing 1 is fitted, to be connected via its mounting dome 18 with a carrier, as well as the motor drive on the dry space side of the carrier. The cable operated by the motor drive is to be connected in a power-transmitting manner with the cable drum 2. Over a bearing pin 17, the cable drum 2 is mounted in the cable drum housing 16. The cable sections going out from both sides of the cable drum 2 initially pass through the cable channels 15 and then traverse in the channel 30a of the guide shaft 30, the inner channel 14 and the spring housing 11 of the receiving element 1a of the cable outlet housing 1.

The cable-guiding element 3 has an inner guide shaft 30, over which the cable-guiding element 3 in the channel 14 of the receiving element 1a is moveably guided. On the inner guide shaft 30, an outer shaft 31 is connected, on which a helically wound compression spring 35 is superimposed. The outer free end of the cable-guiding element 3 constitutes a head 32, on whose facing surface an elastic damping element 33 is arranged for receiving.

Figure 2:
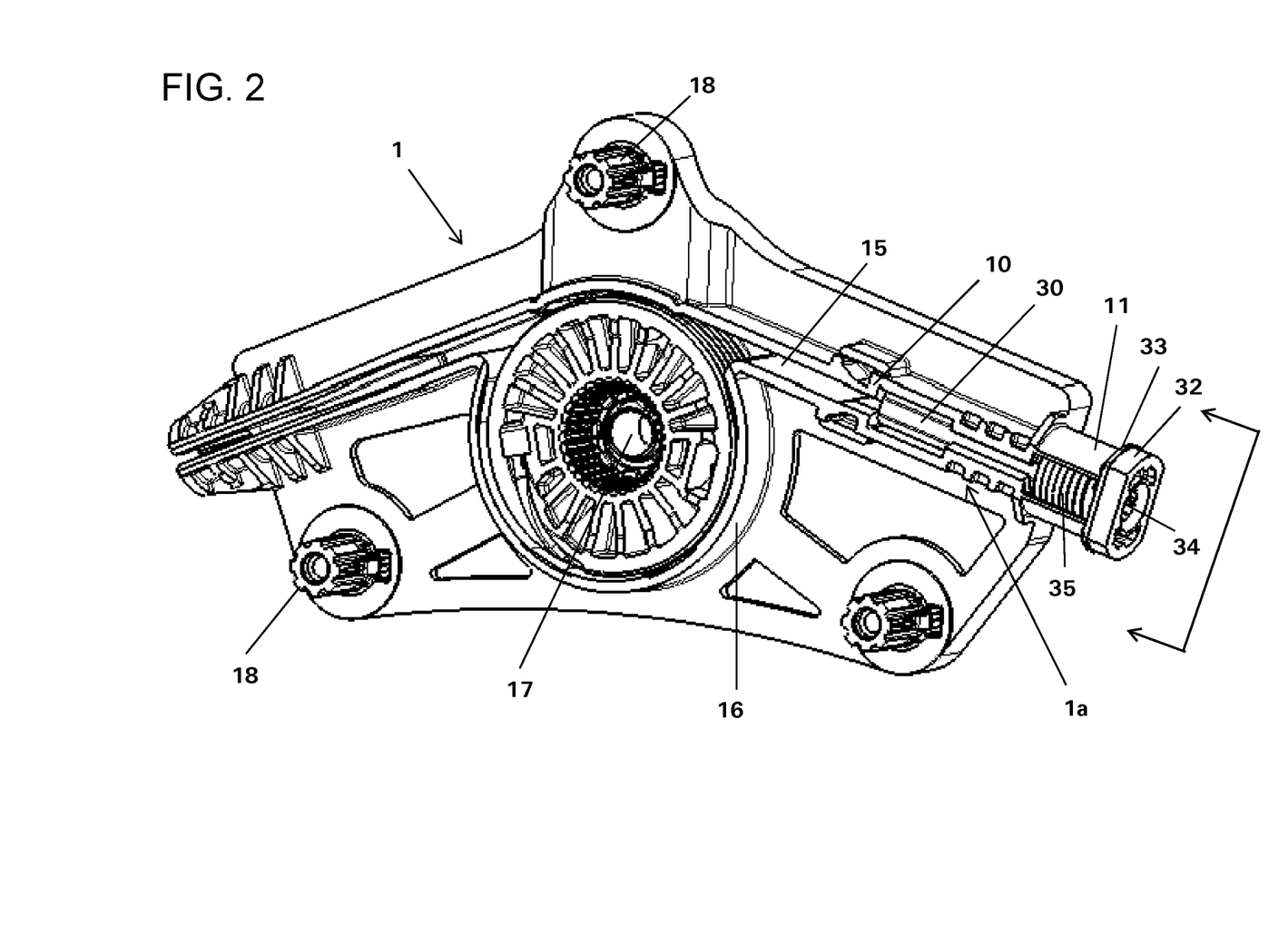
FIG. 2 is a perspective view of the assembly according to FIG. 1.

In the assembled state (see FIG. 2), the spring 35 is supported on the one hand within the spring housing 11 on the support surface 13, and on the other hand on the head 32 and/or the upstream damping element 33. The cable channel 30a of the inner guide shaft 30 expands in the region of the adjoining outer guide shaft 31 to a Bowden tube receiving element 34, so that the clamping force of the spring 35 may exert an axial pressure on the Bowden tube 40 in order to keep the cable guided therein taut.

Figure 3A:
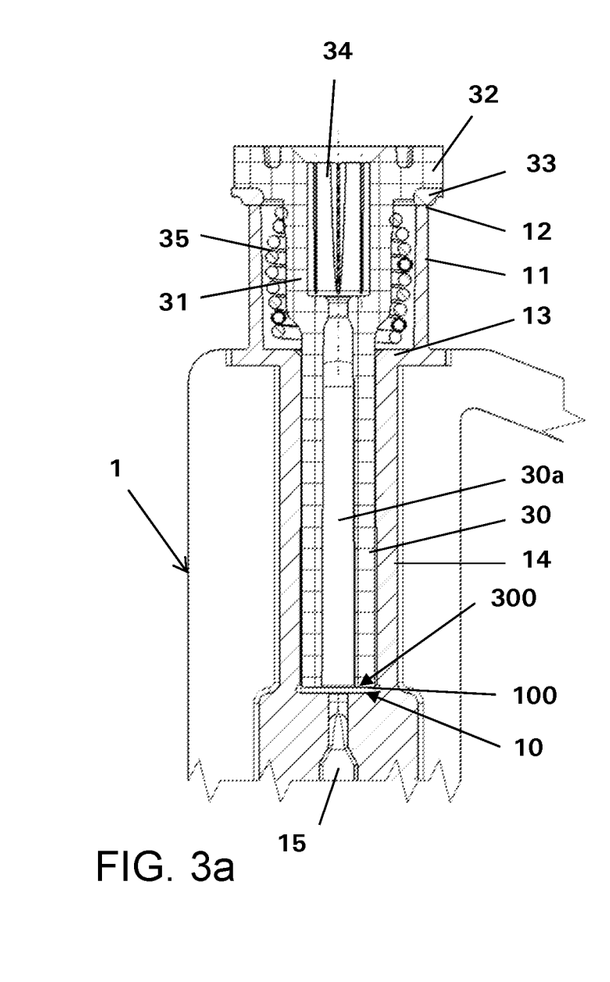
FIG. 3a is a sectional view with a (still) uncompressed damping element arranged between the head of the cable-guiding element and the free edge of the spring housing.

The section of FIG. 3a shows the cable-guiding element 3, the damping element 33, the free edge 12 of the spring housing 11, although already touches, but without this to compress. Between the free end 300 of the inner guiding shaft 30 and the stop 10 of the receiving element 1a of the housing 1, a gap 100 is clearly recognizable. Only with a further increase in the cable force, these stops 10, 300 engage with each other (see FIG. 3b), whereby the damping element 33 for this dimensioning is compressed to the maximum possible value of the compression. This ensures that the damping element 33 cannot be overloaded, and permanently retains its damping properties.

Figure 4A:
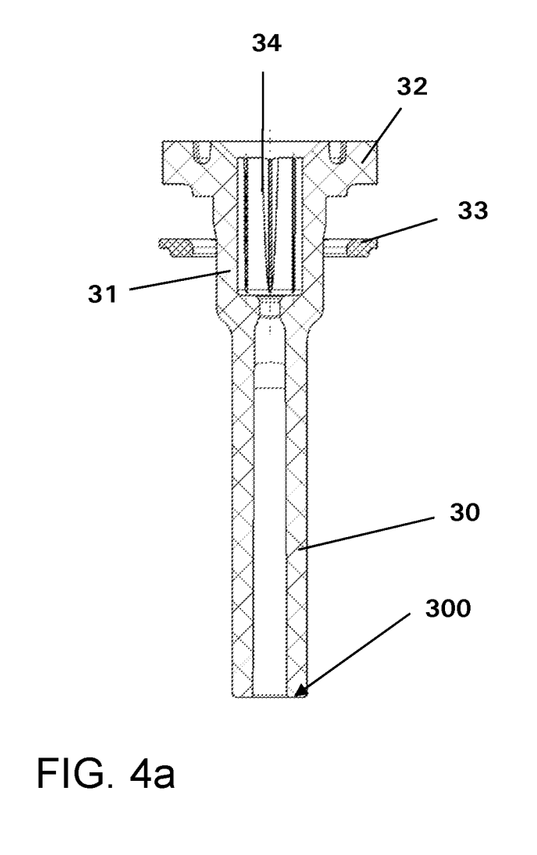
FIG. 4a is a sectional view of a cable-guiding element with a separate damping element in the mounting position.
Figure 4B:
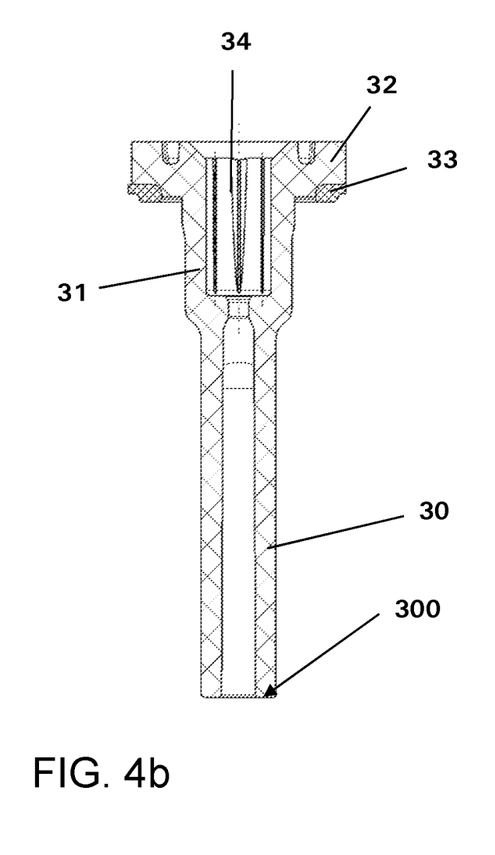
FIG. 4b as FIG. 3a, but with a sealing element in a functional position, which could also be injection-molded on the head of the cable-guiding element.

The illustrations of FIGS. 4a and 4b are intended to indicate that the damping element 33 may be introduced or integrated into the device in different ways. Thus, not only the provision of a separate damping element 33 is possible, but also an injection molding of the sealing element 33 by a so-called 2-component injection molding process, in which first the one component, e.g. the main body of the damping element 33, and then the other component, e.g. the sealing element 33 are produced, whereby a non-detachable composite is designed. Of course, it is also possible to inject the damping element 33 to the free edge 12 of the spring housing 11.

Figure 5A:
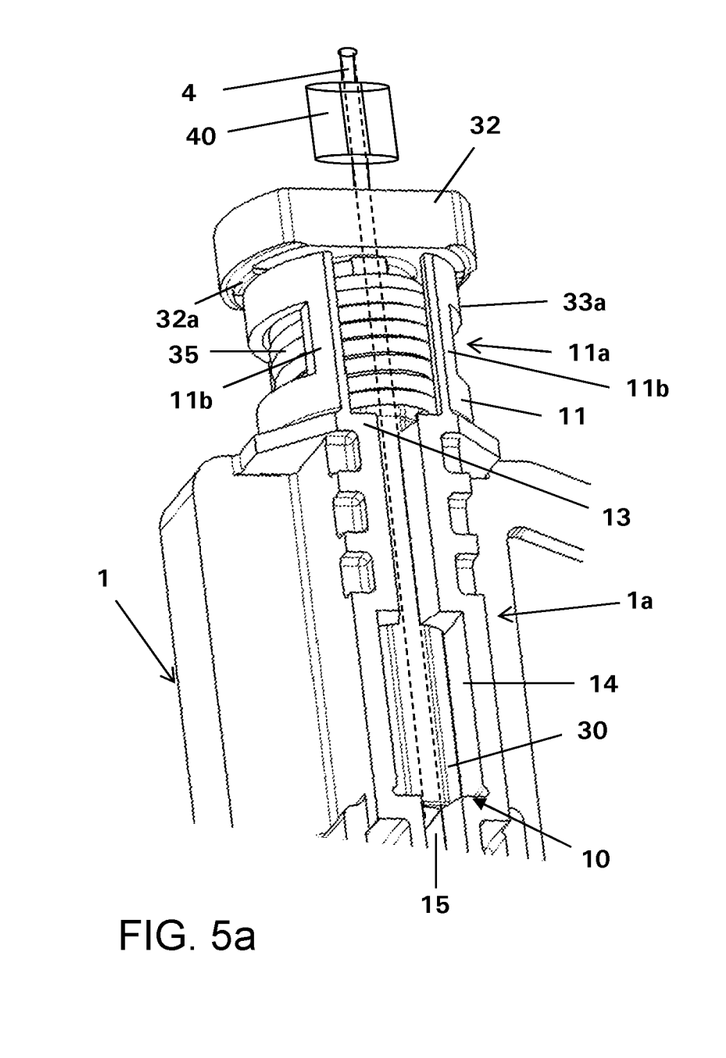
FIG. 5a perspective view of one or more embodiments that includes a partition-like damping element integrated in the spring housing.
Figure 5B:
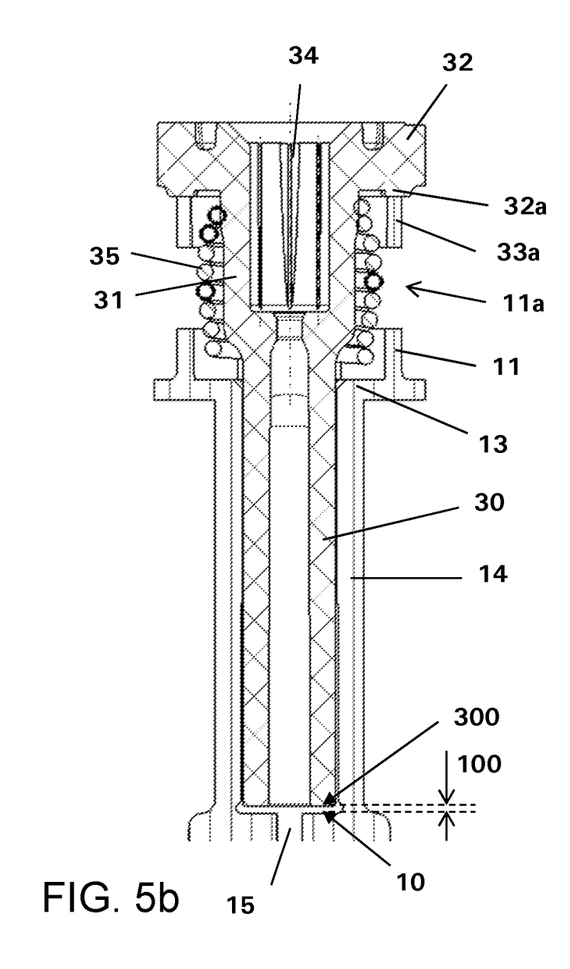

FIGS. 5a and 5b show one or more embodiments, which manages without a separate element and also without another material for the damping element. For the purpose of generating the desired damping effect, an elastic spring element 33a is integrated into the spring housing 11. For this purpose, a window-like recess 11a is provided in the spring housing 11, in such a way that a spring-elastic partition extending transversely thereto extends between lateral, axially directed supports 11b at the free end of the spring housing 11, which forms the damping element 33a. An integrally designed projection 32a at the bottom of the head 32 of the cable guide element 3 ensures that the cable force defined in the middle region of the integrated damping element 33a is introduced.

The dimensioning was made such that the deflection of the springy partition 33a corresponds to the axial dimension of the projection 32a of the head 32 and thereby no overloading of the damping element 33a may occur. Once the maximum elastic deformation of the damping element 33a is achieved, the stop surfaces above the side supports 11b engage with the associated surfaces of the head 32 laterally of the projections 32a, thus preventing overloading of the integrated damping elements 33a.

Figure 3B:
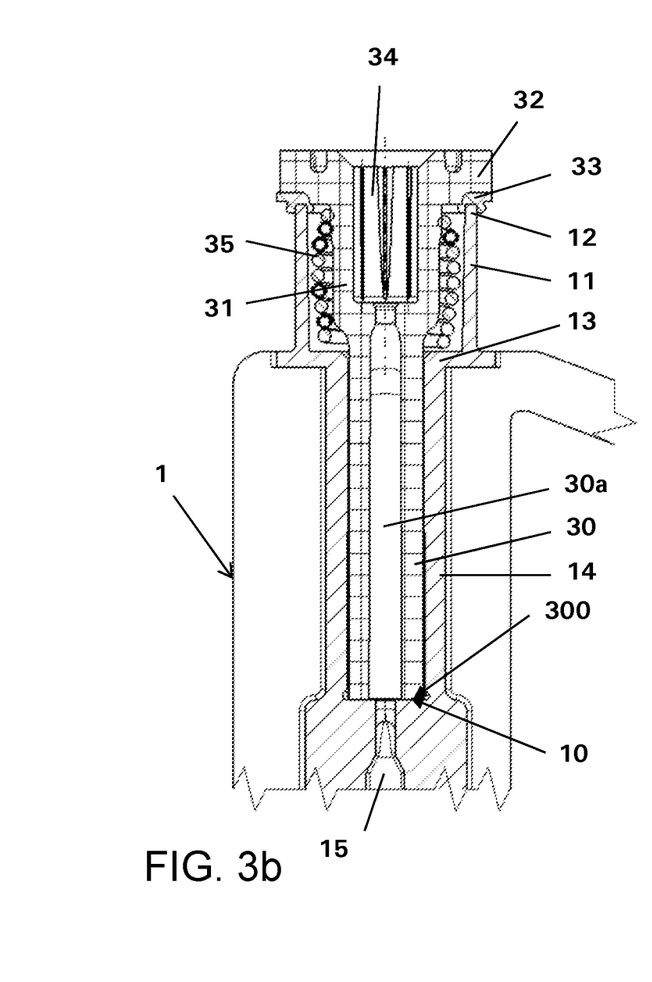
FIG. 3b, like FIG. 3a, but with a compressed damping element.

In the present embodiment, a further pair of stops 10, 300 is provided (but not necessarily required), analogously to the already described variant according to FIGS. 3a and 3b. Accordingly, the cable-guiding element 3 is pushed further into the receiving element 1a when the cable force is increased, until the gap 100 between the stops 10, 300 is overcome. These stops should be used when the lateral supports 11b of the spring housing 11 are not suitable, in order to be able to carry the maximum possible support force.

LIST OF REFERENCE NUMBERS

1 Housing, Cable outlet housing
1a Receiving element for the cable-guiding element 3
10 Inner receiving element
11 Spring housing
11a Recess
11b Lateral supports
12 Outer stop; free edge of the spring housing 11
13 Support surfaces for spring 35
14 Inner channel
15 Cable channel 16 Cable drum housing
17 Bearing pin
18 Mounting dome
100 Gap
2 Cable drum
3 Cable-guiding element
30 Inner guide shaft
30a Cable channel of the guide shaft
31 Outer guide shaft
32 Head
32a Protrusion
33 Spring-elastic damping element, separately designed
33a Spring-elastic damping element, integrated
34 Bowden cable-Receiving element
300 Free end
4 Cable
40 Bowden tube

The invention claimed is:

1. A device for compensating for cable play within a cable window lifter, including a Bowden cable, the device further including
a cable-guiding element, configured to receive an end of the Bowden, mounted in an axially displaceable manner in a receptacle, the device further including
a spring arranged between a support surface of the receptacle and a head of the cable-guiding element, configured to apply a first load to the cable to keep the cable under tension, and
a first pair of stops and a second pair of stops between the cable-guiding element and the receptacle, the first pair of stops and the second pair of stops each including stop surfaces, wherein the stop surfaces of the first pair of stops and stop surfaces of the second pair of stops are configured to engage one another when a second load is applied to the cable,
wherein the first pair of stops and the second pair of stops are collectively configured
such that
in response to a cable force exceeding a tensioning force of the spring, the first pair of stops engage an intermediate damper formed of an elastic material, and
after a predetermined length of compression of the intermediate damper, the stop surfaces of the second pair of stops engage with each other, and wherein the first pair of stops are formed of a first material and the second pair of stops are formed of a second material, wherein the second material has a hardness that is greater than a hardness of the first material.

2. The device according to claim 1, wherein stops of the first pair of stops are formed by an outer edge of a spring housing and by a surface of a head of the cable guide element, wherein the head of the cable guide element faces the outer edge.

3. The device according to claim 2, wherein the intermediate damper is integral to the spring housing.

4. The device according to claim 3, wherein the spring housing includes lateral supports formed of a non-elastic material and defining a clearance, wherein a resilient section extends between the lateral supports of the spring housing, and the resilient section is configured to act as a damping element, wherein the lateral supports collectively form the first pair of stops and a protrusion, integrally designed on the head, is configured to act on the damping element, until areas of the head laterally adjoining the protrusion rest on the stop surfaces of the first pair of stops.

5. The device according to claim 1, wherein the intermediate damper is arranged between the stops of the first pair of stops is a separate element formed of an elastomer or rubber.

6. The device according to claim 1, wherein the intermediate damper is injection-molded by 2-component injection molding to the cable guiding element or to a free edge of the spring housing of the receptacle.

7. The device according to claim 1, wherein a first stop of the second pair of stops is formed by a portion of an inner channel of the receiving element and a second stop of the second pair of stops is formed by a free end of an inner guide shaft of the cable-guiding element.

8. The device according to claim 7, wherein the first stop or the second stop includes a damping element, wherein the damping element is formed of a third material and the intermediate damper is formed of a fourth material, wherein the third material has a lower elasticity than an elasticity of the fourth material.

9. The device of claim 8, wherein the third material has a fatigue strength that is greater than a fatigue strength of the fourth material.

10. The device according to claim 1, wherein the receptacle is formed by a component of a cable outlet housing of a window lifter drive or a mounting element, including a mounting plate of a door module.

11. A window lifter assembly comprising:
a cable outlet housing defining a cable channel configured to receive a cable;
a cable guiding element including a head, an inner guide shaft, and an outer guide shaft extending between the head and the inner guide shaft, wherein a portion of the head forms a first stop and wherein a portion of the inner guide shaft forms a second stop;
a receiving element defining an inner guide shaft channel wherein the inner guide shaft channel terminates at the cable channel to form a third stop arranged to engage the second stop;
a spring housing extending from the receiving element, wherein a portion of the spring housing forms a fourth stop;
a spring disposed in the spring housing, wherein the spring defines a spring rate configured to apply tension to the cable; and
a damping element disposed between the first stop and the fourth stop.

12. The window lifter assembly of claim 11, wherein when a first force is applied to the cable, the first stop and the fourth stop compress the damping element.

13. The window lifter assembly of claim 12, wherein when a second force, greater than the first force, is applied to the cable, the second stop engages the third stop.

14. The window lifter assembly of claim 11, wherein the damping element is attached to the head of the cable guiding element.

15. The window lifter assembly of claim 14, wherein the damping element is integrally formed with the head by a 2-component injection molding process.

16. The window lifter assembly of claim 11, wherein the spring housing includes a support surface and axially extending supports extending therefrom and wherein the damping element extends from the axially extending supports.

17. A window lifter assembly comprising:
a cable outlet housing defining a cable channel configured to receive a cable;

a cable guiding element including a head and a tapered shaft extending from the head to a free end;

a receiving element defining an inner guide shaft channel wherein an inner surface of the inner guide shaft channel terminates at the cable shaft and the free end of the cable guiding element and the inner surface are collectively configured to form a first pair of stops;

a spring housing extending from the receiving element, wherein the head and a portion of the spring housing are collectively configured to form a second pair of stops;

a spring disposed in the spring housing, wherein the spring defines a spring rate configured to apply tension to the cable; and a first damping element disposed between each stop of the first pair of stops, so that in response to a cable force exceeding a first force, the damping element is configured to deform prior to the first pair of stops contacting one another.

18. The window lifter assembly of claim 17, wherein when a first force is applied to the cable, the first damping element is partially compressed.

19. The window lifter assembly of claim 18, wherein when a second force, greater than the first force, is applied to the cable, the first damping element is fully compressed and stops of the first pair of stops engage one another.

* * * * *